April 19, 1949.   E. W POTTMEYER   2,467,945
VALVE FOR GAS DUCTS

Filed March 3, 1944   5 Sheets-Sheet 1

INVENTOR
Edward W. Pottmeyer
by his attorneys
Stebbins, Blenko & Webb

April 19, 1949.  E. W POTTMEYER  2,467,945
VALVE FOR GAS DUCTS
Filed March 3, 1944  5 Sheets-Sheet 2
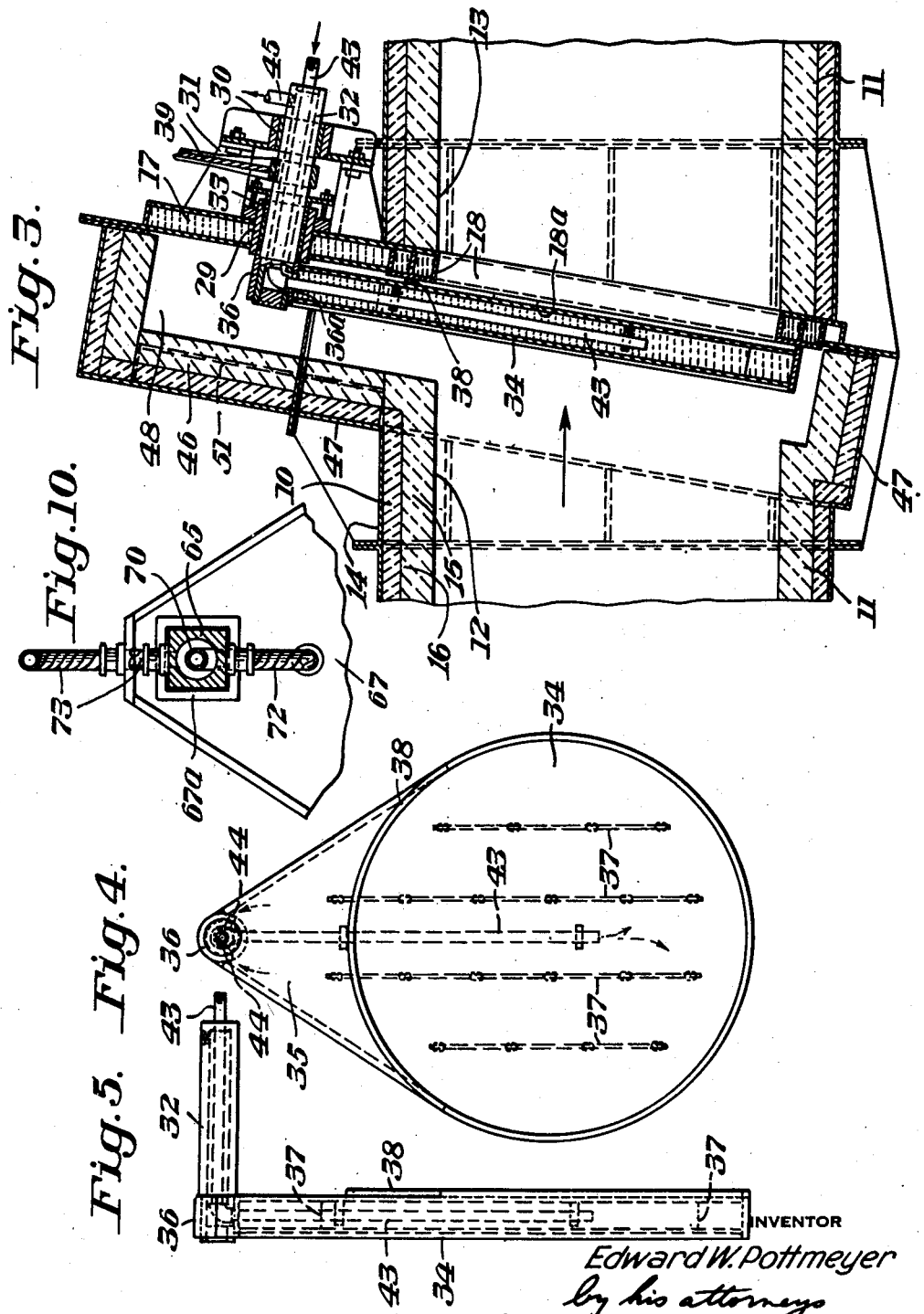
INVENTOR
Edward W. Pottmeyer
by his attorneys
Stebbins, Blenko & Webb

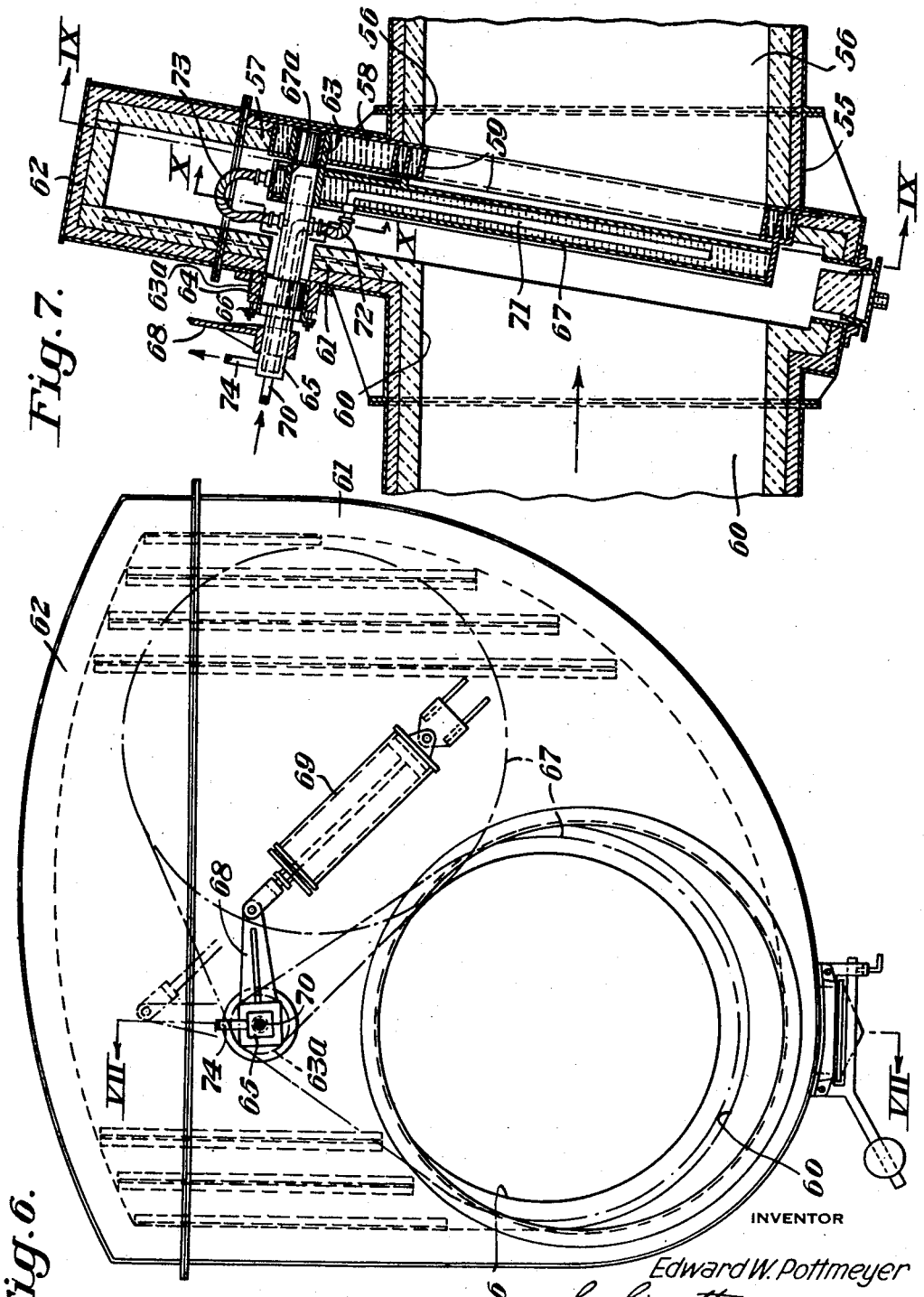

April 19, 1949. E. W POTTMEYER 2,467,945
VALVE FOR GAS DUCTS
Filed March 3, 1944 5 Sheets-Sheet 4
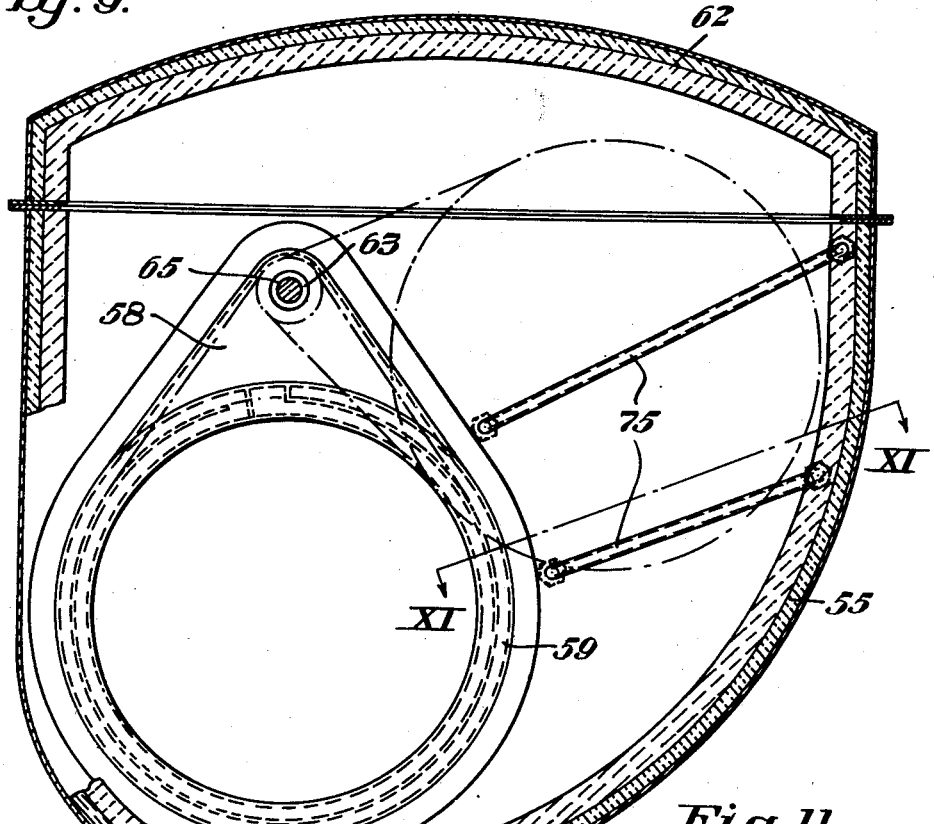
Fig. 9.
Fig. 11
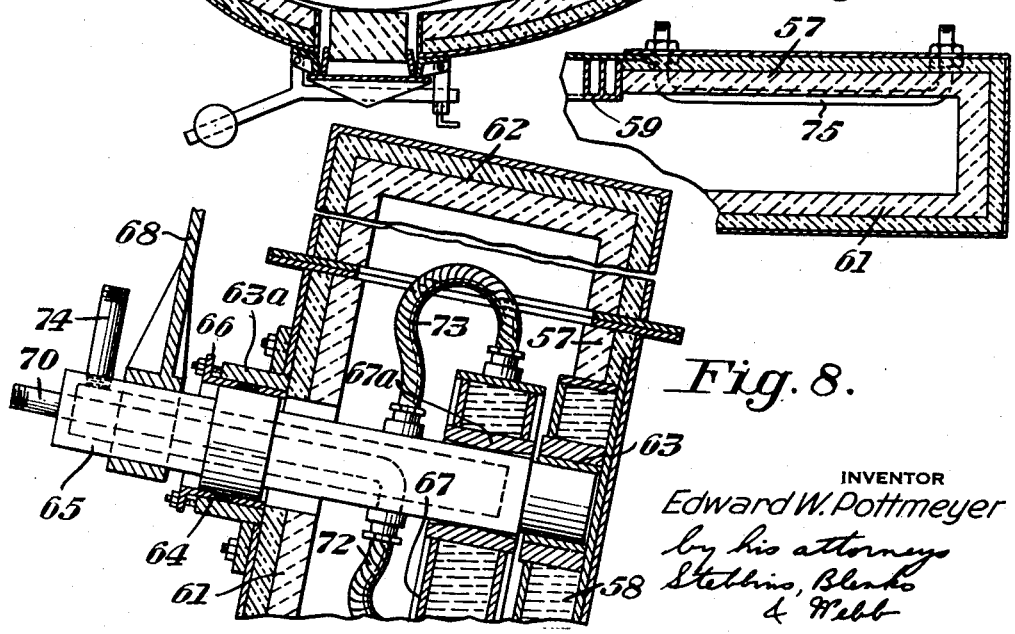
Fig. 8.
INVENTOR
Edward W. Pottmeyer
by his attorneys
Stebbins, Blenko
& Webb INVENTOR
Edward W. Pottmeyer Patented Apr. 19, 1949

2,467,945

UNITED STATES PATENT OFFICE 2,467,945

VALVE FOR GAS DUCTS

Edward W. Pottmeyer, Pittsburgh, Pa., assignor to Blaw-Knox Company, Pittsburgh, Pa., a corporation of New Jersey Application March 3, 1944, Serial No. 524,895

11 Claims. (Cl. 251—18)

This invention relates to a valve and, in particular, to a valve for controlling the flow of hot gases through a duct under substantial pressure.

The construction of valves suitable for controlling the flow of hot gases through ducts under substantial pressure presents a series problem, particularly in the case of valves for ducts of large size, e. g. as large as 6' in diameter, as now required in certain installations. Hot-gas ducts now in operation, furthermore, are called upon to convey gases at temperatures as high as 1800° F. and pressures as high as 70" of water. Known types of valves for gas ducts are not adapted for such service. The moving parts of valves composed of refractory material cannot be made to fit tightly enough to shut off gas flow completely under the pressure mentioned. While water-cooled metal valves have been used previously, the known constructions are suited only for gas lines operating at relatively low pressure, such as 2" of water. These valves, furthermore, have been characterized by operating difficulties resulting from the necessity for providing sliding pipes moving with the valve for circulating cooling water therethrough.

I have invented a novel form of valve especially adapted for controlling the flow of gases through ducts at high temperatures and under substantial pressure, such as mentioned above. In a preferred embodiment, my invention comprises a duct section including an inlet passage and an outlet pasage adapted to be connected in a gas duct. A water-cooled panel intermediate the ends of the section has a seat conforming to the shape of the section with a plane exposed face. The panel is inclined at an angle to the vertical. A valve closure in the form of a hollow metal body is hung on a shaft perpendicular to said face, for angular movement from a closed position overlying the valve seat to an open position laterally thereof. A hood engaging the panel defines therewith a closed lateral extension communicating with the duct section. The extension forms a sealed space or pocket for accommodating the valve closure in open position. The duct section and the hood of the lateral extension are preferably lined with refractory brick in accordance with the usual practice in constructing ducts for conveying hot gases. Water-cooled members extending laterally across the panel from the valve seat into the pocket have bearing surfaces lying in the plane of the face of the valve seat, and the valve closure slides along these surfaces in moving from one position to another. Connections for supplying cooling fluid to the interior of the valve closure pass through the shaft on which it is mounted.

Further novel features and advantages of the invention will become apparent from the following detailed description and explanation which refer to the accompanying drawings illustrating the preferred embodiment and modifications. In the drawings, Figure 1 is a front elevation of the hood structure forming one side of the valve pocket and the inlet passage, as projected on a plane parallel to that defined by the face of the valve seat, with the lining of the inlet passage omitted;

Figure 3 is a vertical section through the valve taken on the plane through the center of the valve seat, showing the valve closure in position thereon;

Figure 4 is an elevation of the valve closure;

Figure 5 is an edge view thereof, showing the supporting shaft;

Figure 6 is an elevation similar to Figure 1 of a modified form of valve with the lining of the inlet passage omitted;

Figure 7 is a vertical section therethrough taken on the plane of line VII—VII of Figure 6;

Figure 8 is a sectional view showing a portion of Figure 7 to enlarged scale;

Figure 9 is a transverse section through the valve taken along the plane of IX—IX of Figure 7.

Figure 10 is a partial sectional view taken on the plane of line X—X of Figure 7;

Figure 11 is a partial section through the valve structure taken along the plane of line XI—XI of Figure 9;

Figure 1:
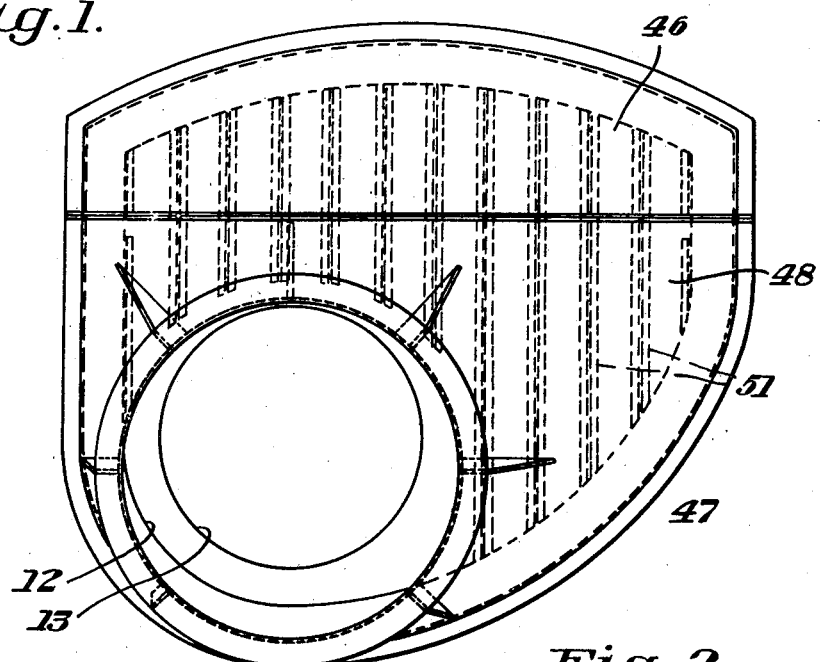

Referring now in detail to the drawings and particularly to Figures 1 through 5, which show a typical installation of the valve in a horizontal duct, the valve of my invention comprises a tubular section 10 adapted to be connected in a hot-gas duct 11, including an inlet passage 12 and an outlet passage 13. The section 10 is composed of sheathing 14 fabricated from metal plate, provided with a refractory lining 15 similar to that of the duct 11 indicated at 16. A flat hollow panel 17 fabricated from plate, having a circular valve seat 18 defining a port therethrough conforming to the shape of the section 10, is disposed in the latter in a plane making an angle somewhat less than 90° with the axis of the section. This causes a portion of the weight of the valve closure described hereinafter, to be effective in urging it toward the seat. The seat 18 has a plane exposed face 18a, parallel to the plane of the panel. Stiffener plates 19 extend between the spaced walls of the panel 17. Inlet pipes 20 and 21 for cooling water extend into the interior of the panel and outlet connections 22 are provided in the upper edge thereof. The plates 19 in addition to stiffening the walls of the panel 17, constitute baffles controlling the flow of cooling water from the pipes 20 and 21, through the interior of the panel and thence to the outlets 22.

The seat 18 has a baffle ring 23 extending there-around between the inner and outer circumferential walls, terminating short of a radial baffle wall 24. An inlet pipe 25 for supplying cooling fluid to the seat extends thereto through the interior of the panel 17. An outlet pipe 26 is similarly installed. With this construction, it will be apparent that cooling water flows through the pipe 25, around the inner periphery of the seat 18, thence around the far end of the baffle ring and back around the outer periphery of the seat to the pipe 26.

Figure 2:
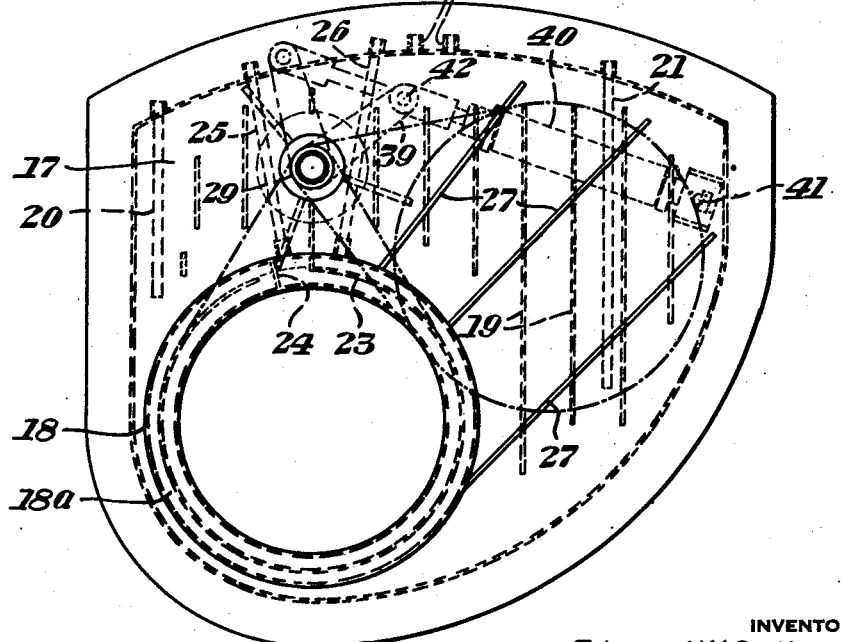
Figure 2 is a similar elevation of the water-cooled panel with the valve seat, against which the hood structure of Figure 1 is adapted to be disposed to constitute the valve as a whole, the valve closure itself being omitted from both Figures 1 and 2.

As clearly shown in Figure 2, the panel 17 extends laterally and upwardly a substantial distance from the seat 18. Ribs 27 extend laterally from the seat 18, being welded to the inner wall of the panel and having their edges in the same plane as the exposed face 18a of the seat 18. The function of the ribs 27 will be explained shortly. A journal bearing 29 extends through the panel 17 above the seat 18. A bearing 30 in alinement with but spaced outwardly from the bearing 29 is supported by radial plate brackets 31 welded to the outer wall of the panel 17. A hollow shaft 32 is journaled in the bearings 29 and 30. A stuffing box 33 is provided on the exterior of the bearing 29 to seal the clearance between the bearing and the shaft.

A valve closure 34 shown in Figures 4 and 5 is hung on the inner end of the shaft 32. As shown in the drawings, the closure is in the form of a flat disc or septum having a projection 35 provided with a hub 36 adapted to receive the inner end of the shaft. The closure is fabricated from plate and has stiffening plates 37 extending between the spaced walls thereof which also serve as baffles to control the flow of cooling water therethrough. The closure is welded or otherwise fixed to the shaft 32. An arcuate rib 38 on the face of the closure adjacent the seat 18 forms a continuation of the exposed edge of the peripheral wall of the closure, which has a diameter intermediate the inside and outside diameters of the seat, thereby constituting a continuous sealing edge engaging the face 18a of the seat 18. This edge rides on the ribs 27 when the valve closure is swung from closed to open position, as indicated in chain lines in Figure 2. Since the engagement of the sealing edge with the valve seat is the only limit to downward axial movement of shaft 32 in its bearings, the closure 34 will obviously tend to seat itself firmly by gravity. The sealing edge may, of course, be formed on the valve seat and the cooperating surface of the valve closure made plane.

A crank arm 39 is secured to the shaft 32 between the bearings 29 and 30. A hydraulic cylinder 40 having a piston and piston rod therein, is provided for actuating the crank 39. The cylinder is pivoted to the outer wall of the panel 17 at 41 and the piston rod is pivoted to the crank at 42. Operating fluid is supplied to either end of the cylinder 40 from any convenient source of fluid under pressure and relieved from the other end, as desired, to operate the valve closure, through suitable piping equipped with a manual control valve.

Cooling water is supplied to the interior of the valve closure by a pipe 43 extending through the closed outer end of the shaft 32 and downwardly through holes 32a in the shaft and hub 36, into the interior of the closure. The pipe 43 is connected by a suitable swivel fitting to a water-supply system. The water supplied through the pipe 43, after flowing around the interior of the valve closure between the baffles 37, passes through holes 44 in the hub 36 and in the shaft 32, through the shaft and out through a fitting 45 which may conveniently have a flexible hose connected thereto.

A refractory-lined hood having upper and lower portions 46 and 47 cooperates with the panel 17, being bolted thereto, to form a hollow lateral extension 48 communicating with the duct section 10 and affording a closed space or pocket to accommodate the closure 34 when in open position. The end of the shaft 32 on which the closure is secured terminates within the pocket, the shaft being supported by the bearings 29 and 30, so that it is necessary to seal only one clearance space between the shaft and the pocket formed by the hood 46, 47 when assembled with the panel 17. The hood and inlet passage are formed of metal sheathing and a lining of refractory brick, the hood portions having T-bars 51 secured to the sheathing for supporting firebrick having slotted sides. With this construction, a valve case or pocket is formed by the hood portions 46, 47 and the panel 17, the former being protected by firebrick on the interior and the latter being cooled by the circulation of water therethrough, like the valve closure 34.

A modified construction shown in Figures 6 through 8 differs from that described above principally in that the wall of the valve case or pocket in which the valve seat is located is constructed like the hood 46, 47, i. e., of metal sheathing and a lining of refractory brick, with a water-cooled metal panel embedded therein of substantially the same shape and size as the valve closure. Since the modified construction is generally similar to the form of the invention already described, the detailed description thereof will be confined to the features distinctive of the former and the corresponding portions will be referred to only in general terms.

The modified valve comprises a duct section 55 including an outlet passage 56. A wall 57 extends upwardly and outwardly from the section 55, being composed of metal sheathing and a refractory brick lining in which is embedded a panel 58 having a valve seat 59. The panel 58 is in the form of a flat hollow structure fabricated from metal plate having suitable connections for supplying cooling fluid to the interior thereof. These connections are not illustrated since the construction is generally similar to that already described. Instead of being fabricated, the panel may be a casting having pipes embedded therein for cooling water, similar to the modification shown in Figures 12 and 13, to be described later. The duct section 55 also has an inlet passage 60 from which a wall 61 similar to the wall 57 extends upwardly and laterally. A refractory-lined hood 62 secured to the upper edges of the walls completes a sealed valve case or pocket communicating with the interior of the section 55.

A journal bearing 63 extends through the inner wall of the panel 58 but terminates at the inner surface of its outer wall. A journal bearing 64 alined therewith is supported on the wall 61. A square shaft 65 has journals in the bearings, and is hollow throughout the greater portion of its length, as shown in Figure 8. A stuffing box 66 seals the clearance between the shaft and bearing 64. Axial movement of the shaft is limited by the engagement of the lower end thereof with the outer wall of panel 58.

A valve closure 67 generally similar to the closure 34 is hung on the shaft 65, without restraint against axial shifting along the shaft. The closure has a socket 67a with a square hole therethrough adapted to receive the inner end of the shaft. A crank 68 is secured to the outer end of the shaft. A cylinder 69 having a piston and piston rod therein is pivoted to the wall 61 and the piston rod is pivoted to the crank for rotating the shaft through a limited angle to move the valve closure from closed to open position in the manner already explained. By reason of the shape of the shaft 65 and the socket 67a, the closure 67 is compelled to move angularly with the shaft. As shown in Figure 10, the interior of socket 67a flares from the median transverse plane toward both ends thereof. This permits tilting movement of the closure 67 relative to the seat 59 so that the former is free to seat itself in tight-sealing engagement with the latter by gravity. This is further facilitated by the fact that the socket of the closure is free to move along the shaft.

An inlet pipe 70 for cooling water extends axially through the hollow portion of the shaft 65, then radially thereof on the inside of the pocket, and has its outer end connected by a swivel fitting to a water-supply system. An inlet pipe 71 extending downwardly through the interior of the closure 67 communicates with the pipe 70 by a flexible connection 72. Cooling water leaves the closure through a similar connection 73 and flows outwardly through the shaft around the pipe 70 and thence through a radial discharge pipe 74, leading to a flexible hose.

Pipes 75 are embedded in the wall 57, extending laterally from the panel 58, with their exposed surfaces lying in the plane of the face of the seat 59, as shown in Figure 11. The pipes 75 are supplied with cooling water by suitable connections (not shown). They serve the same purpose as the ribs 27, i. e., the closure 67 slides thereon as it swings from closed to open position.

Figure 12:
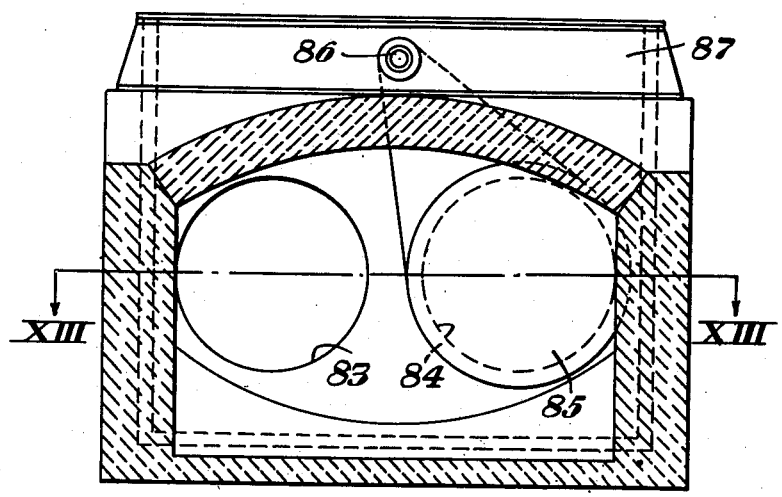
Figure 12 is a transverse section through a gas duct having a further modified form of the invention installed therein.
Figure 13:
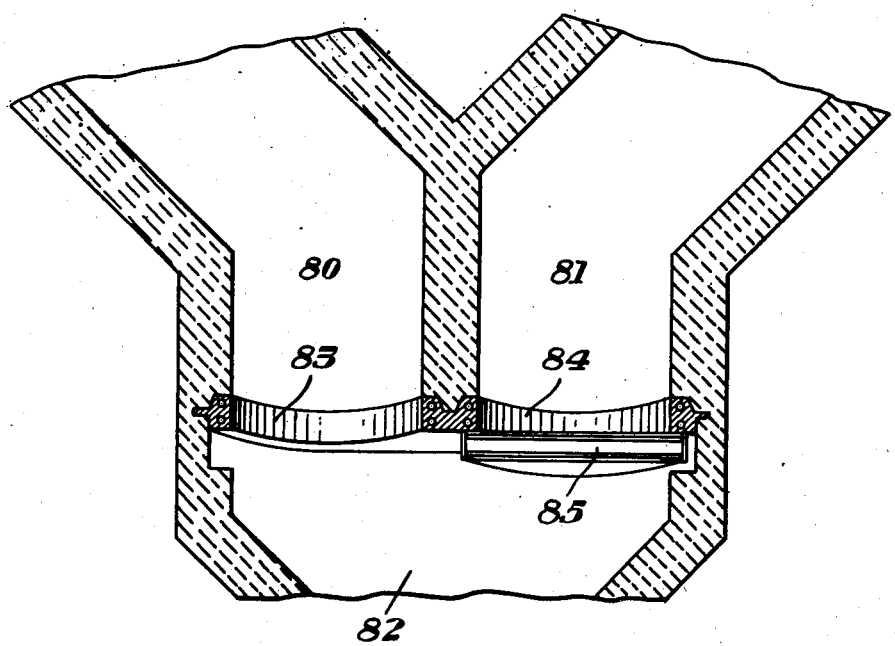
Figure 13 is a horizontal section taken along the plane of line XIII—XIII of Figure 12.

Figures 12 and 13 show a further modification of the invention adapted to control the flow of gas from either of two ducts 80 and 81 to a connecting duct 82. In this construction, valve seats 83 and 84 comprise an integral casting having pipes cast therein to form conduits for cooling water. These pipes circumscribe the ports defined by the seats and terminate at suitable inlets and outlets, in a manner well known to the art. The seats are disposed in the ducts 80 and 81 adjacent the point where they merge into the duct 82. A valve closure 85 similar to those shown at 34 and 67 is mounted on a shaft 86 journaled in cross beams 87 resting on the side walls of the ducts 80 and 81. A hood like that shown at 62 may be used to close the space above the seats and closure. Cooling water is supplied to the valve closure 85 by means similar to those included in the preferred embodiment and modification previously described. It will be understood that the closure 85 may be moved by turning the shaft 86, from a position overlying one of the seats 83, 84 to a position overlying the other, thereby alternately admitting gas from one of the ducts 80, 81 to the duct 82 and cutting off the flow of gas from the other. In some cases, it may be desirable to cause the flow of gases from duct 80 to duct 82 and later from duct to duct 81. Both these arrangements, obviously, have particular application to reversing-valve installations, without changes in the construction.

It will be apparent from the foregoing description and explanation that my invention provides a valve for hot-gas ducts having important advantages over valves known heretofore, particularly for ducts of large size conducting gas at high temperature and under substantial pressure. All the exposed metal parts such as the valve closure, its supporting shaft, the valve seat and the panel forming a wall of the valve pocket, or a portion thereof, are cooled by the circulation of water therethrough, thus preventing overheating, burning or warping. The remainder of the valve structure is protected by a lining of refractory brick. Tight-sealing engagement between the valve closure and its seat is assured at all times by making the supporting shaft slidable longitudinally in its bearings in one case, and by mounting the closure for longitudinal and tilting movement on the shaft in the other, thus preventing leaks from faulty seating. The elimination of the possibility of warpage by the effective cooling of the valve closure and seat, prevents the development of leaks which would result from such warpage should it occur. The water-cooled rails extending laterally from the valve seat support the valve closure in the plane of the face of the seat so that it returns smoothly to closed position in tight engagement with the seat. By supplying cooling water to the closure through the shaft on which it is hung, I avoid the difficulties characteristic of previous valves moving rectilinearly and having sliding water-supply pipes connected thereto. The entire construction of the valve and its enclosing pocket is simple and without special complications so that the manufacturing cost thereof is not excessive.

Valves embodying my invention may be installed in ducts extending in any direction, i. e., horizontal, vertical or at an intermediate angle. When installed in a vertical duct, the entire weight of the valve is effective to hold it down on its seat, so it is not necessary that the plane of the latter be inclined to the axis of the duct. When installed in ducts at an angle to the horizontal or vertical, the seat should be in a plane at an angle such as to produce some tendency to seat the valve by gravity.

Although I have illustrated and described a preferred embodiment with certain modifications, it will be understood that changes in the construction and arrangement disclosed may be made without departing from the spirit of the invention or the scope of the appended claims.

I claim:

1. A valve for a hot-gas duct comprising a re-

1. A valve for a hot-gas conduit comprising a refractory-lined conduit section adapted to be connected in the duct, said section having a hollow valve seat intermediate its ends defining a port conforming to the section, said seat having connections for circulating cooling fluid therethrough, a valve closure mounted on a shaft spaced from said seat for angular movement from a closed position in alinement with said section to an open position laterally of the section, and a refractory-lined pocket extending laterally from said seat and communicating with the interior of the section adapted to accommodate said closure in open position, said closure being hollow and said shaft having conduits therein for circulating fluid through the interior of the closure.

2. A valve for a hot-gas conduit comprising a refractory-lined housing, a water-cooled metal seat defining a port, a valve closure movable from a position on said seat to a position laterally thereof and elongated water-cooled members extending laterally of said seat, having bearing surfaces lying in the plane thereof adapted to support the closure when moving to open position.

3. A valve as defined by claim 2 characterized by said water-cooled members being tubes.

4. A valve for hot-gas ducts comprising a refractory-lined duct section, a hollow metal seat having a plane face defining a port in the section intermediate its ends, a housing, said seat forming a portion of one wall of said housing, a valve closure in the form of a hollow septum adapted to overlie said seat and make sealing engagement therewith which is substantially gas tight under pressures of the order of 50" of water or greater, a bearing in said housing normal to the face of the seat, a shaft journaled in said bearing, packing sealing the space between the shaft and bearing, said closure being carried on said shaft and movable to an open position laterally of said seat, said housing including a laterally extending pocket to accommodate the closure in open position, one end of said shaft projecting through a wall of the housing, and means for supplying cooling fluid to the interior of the closure through said shaft.

5. A valve as defined by claim 4 characterized by water-cooled rails extending from said duct section into said pocket, said rails having bearing surfaces in the plane of said face, adapted to be engaged by said face when moving toward open position.

6. A valve comprising a seat defining a port in a duct section intermediate its ends and lying in a plane inclined to the vertical, a closure adapted to rest on said seat, a shaft spaced from the seat and perpendicular to said plane, said closure being mounted on said shaft and rotatable therewith for swinging movement between closed and open positions, and inlet and outlet passages for circulating cooling fluid through the closure, said passages extending through the shaft, said closure being non-rotatable relative to the shaft but free to tilt and engage said seat by gravity.

7. A water-cooled valve for hot gases comprising a hollow valve case having a hot-gas inlet passage, and a hot-gas outlet passage, the case having a laterally extending interior space, a water-cooled metal valve seat forming the inner end of one of the hot-gas passages, the seat having a plane face, a valve closure inside the valve case adapted to lie in closed position over the valve seat and to slide on said face to open position in the laterally extending interior space, the closure being a hollow metal body with a plane face adapted to lie over the valve seat and make sealing contact therewith which is substantially gas tight, an operating shaft secured to the valve closure, the shaft being normal to the face of the seat, spaced from the valve seat and projecting through a wall of the valve case, a bearing supporting the shaft, packing sealing the space between the shaft and bearing, and connections for circulating cooling water through the closure.

8. A water-cooled valve for hot gases comprising a hollow valve case having a hot-gas inlet passage and a hot-gas outlet passage, the case having a laterally extending interior space, a water-cooled metal valve seat forming the inner end of one of the hot-gas passages, the seat having a plane face, a valve closure inside the valve case adapted to lie in closed position over the valve seat and to slide on said face to open position in said interior space, the closure being a hollow metal body with a plane face adapted to lie over the valve seat, and make sealing contact therewith which is substantially gas tight, an operating shaft secured to the valve closure, the shaft being normal to the face of the seat and spaced from the valve seat, one end of the shaft terminating within the valve case and the other end projecting through a wall thereof, a bearing supporting the shaft, packing sealing the space between the shaft and bearing, and means for circulating cooling water through the shaft from a point exteriorly of the valve case to the inside of the valve closure.

9. A water-cooled valve for hot gases comprising a hollow valve case having a hot-gas inlet passage, and a hot-gas outlet passage, the case having a laterally extending interior space, a water-cooled metal valve seat forming the inner end of one of the hot-gas passages, the seat having a plane face at an angle to the vertical, a valve closure inside the valve case adapted to lie in closed position over the valve seat and to slide laterally on said face to open position in said interior space, the closure being a hollow metal body with a plane face adapted to lie over the valve seat, an operating shaft secured to the valve closure, the shaft being spaced from the valve seat, normal to the plane thereof and projecting through a wall of the valve case, means for circulating cooling water through the closure, and elongated water-cooled members extending laterally from said seat into said space having bearing surfaces lying in the plane of the face of said seat and adapted to support said closure in moving to open position.

10. A water-cooled valve for hot gases comprising a hollow valve case having a hot gas inlet passage, a hot-gas outlet passage, and a laterally extending pocket, a water-cooled metal valve seat forming the inner end of one of the hot-gas passages, the seat having a plane face, a valve closure slidable on the face from a closed position over the valve seat to an open position in said pocket, the closure being a hollow metal body with a plane face adapted to overlie the valve seat, and make sealing contact therewith which is substantially gas tight under pressures of the order of 50" of water or greater, an operating shaft secured to the valve closure, the shaft being normal to the face of the seat, spaced from the valve seat and projecting through a wall of the valve case, a bearing supporting the shaft, packing sealing the space between the shaft and bearing, and cooling-water passages extending through the shaft to a point exteriorly of the valve case.

11. A valve closure adapted to cooperate with a seat defining a port intermediate the ends of a duct section, said closure comprising a hollow metal septum, a shaft extending laterally of the seat and normal to the plane thereof, said closure being mounted on said shaft for angular sliding movement between closed and open positions and inlet and outlet passages for circulating cooling fluid through the closure, said closure being free for tilting movement on the shaft to permit firm engagement of the seat by the closure.

EDWARD W. POTTMEYER.

REFERENCES CITED

The following references are of record in the file of this patent:

UNITED STATES PATENTS

| Number | Name | Date |
|---|---|---|
| 593,476 | Kennedy | Nov. 9, 1897 |
| 812,683 | Schenck | Feb. 13, 1906 |
| 1,013,961 | Shutts | Jan. 9, 1912 |
| 1,111,399 | Morse | Sept. 27, 1914 |
| 1,600,793 | Bogan | Sept. 21, 1926 |
| 1,897,781 | Wille | Feb. 14, 1933 |
| 1,980,495 | Muir | Nov. 13, 1934 |
| 2,048,696 | Hellan | July 28, 1936 |
| 2,121,686 | Currie | June 21, 1938 |
| 2,331,465 | Fox | Oct. 12, 1943 |